Feb. 24, 1925.  
O. C. BAER ET AL  
1,527,771

APPARATUS FOR MELTING WAX OR LIKE SUBSTANCE

Filed March 26, 1923

Witnesses:

Inventors:  
Oscar C. Baer &  
Robert L. Wheat.  
By Joshua R. H. Potts  
Their Attorney Patented Feb. 24, 1925.

1,527,771

UNITED STATES PATENT OFFICE.

OSCAR C. BAER AND ROBERT L. WHEAT, OF CHICAGO, ILLINOIS.

APPARATUS FOR MELTING WAX OR LIKE SUBSTANCE.

Application filed March 26, 1923. Serial No. 627,550.

*To all whom it may concern:*

Be it known that we, OSCAR C. BAER and ROBERT L. WHEAT, citizens of the United States, and residents of the city of Chicago, county of Cook, and State of Illinois, have invented certain new and useful Improvements in Apparatus for Melting Wax or like Substance, of which the following is a specification.

Our invention relates to improvements in apparatuses for melting wax or like substance and has for its principal object the provision of an improved construction of this character which will be highly efficient in use.

The invention consists in the combinations and arrangements of parts hereinafter described and claimed.

Figure 1:
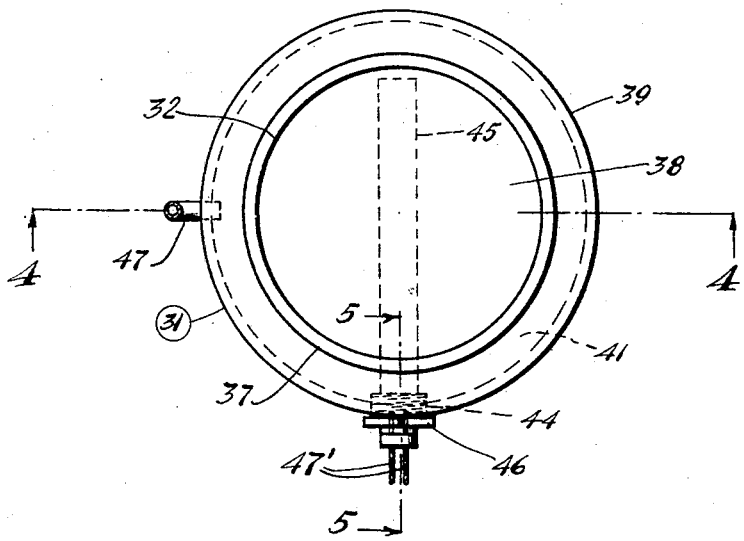
Figure 2:
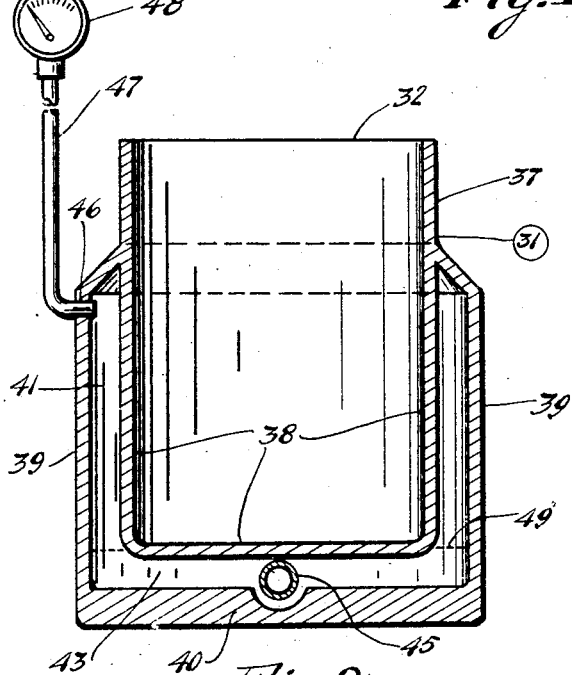
Figure 3:
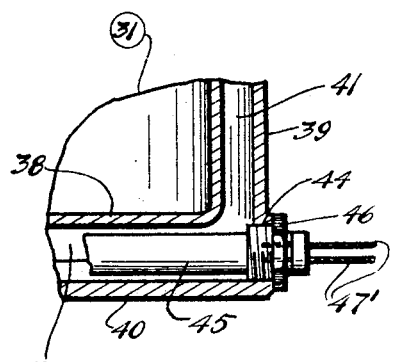

The invention will be best understood by reference to the accompanying drawings, forming a part of this specification, and in which, Fig. 1, is a top plan view of the melting pot embodied in the invention;

Fig. 2, is a sectional view of the same taken substantially on line 4—4 of Fig. 1; and Fig. 3, is a fragmentary sectional view taken substantially on line 5—5 of Fig. 1.

Referring to the drawings, 31 indicates the pot as a whole, 37 indicates the pot which receives the melted wax and includes the mouth 32 and side and bottom walls 38 surrounded by outer walls 39 and a bottom 40 in spaced relation with respect thereto forming side and bottom cavities 41 and 43 in open communication with respect to each other. Formed in the side walls 39 is a threaded opening 44 within which an electric heating element 45 passes and extends into the cavity 43. This electric heating element is carried by a plug 46 screw threaded in the opening 44 and in circuit with a suitable source of electric energy by conductors 47. Communicating with the cavity 41 at the top thereof and passing through an opening 46 formed in the side walls 39 is a pipe 47 carrying a removable steam gauge 48.

Water is introduced through the opening 44 to a level indicated at 49 and heated by the electric heating element 45, generated into steam circulating within the cavity 41. The gauge 48 is removed and air is allowed to escape until steam issues from the mouth of the pipe, at which time the gauge is replaced, to confine the steam within the chamber. The steam heats the walls and bottom 38 of the pot which in turn melts the wax received thereby and upon throwing the electric heating element out of operation the steam cools and condenses and finds a resting place in the cavity 43.

By the method of producing a heating agent, as above described for melting wax or like substance it will be apparent that the water within the cavities 41 and 43 can be generated into steam, permitted to condense and reheated any number of times without adding additional water thereto.

It will also be apparent that I provide an apparatus for melting wax or like substance which will be highly efficient in use and economical in manufacture.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as some within the scope of the appended claim.

Having described our invention what we claim as new and desire to secure by Letters Patent, is:

A device for melting wax or like substance including an open receptacle adapted to receive the substance, wall portions surrounding the sides and bottom of the receptacle in uniform spaced relation with respect thereto providing a continuous air tight chamber adapted to receive a fluid, means within the chamber for heating the fluid to generate steam, a pipe in direct communication with the chamber, a gauge carried by the pipe, said gauge being adapted to be removed to permit air to escape from said chamber during the generation of the steam and adapted to be replaced after the expulsion of the air from said chamber.

In testimony whereof we have signed our names to this specification in the presence of two subscribing witnesses.

OSCAR C. BAER.
ROBERT L. WHEAT.

Witnesses:
FREDA C. APPLETON,
CLARENCE E. THREEDS.